(12) United States Patent
Xu et al.

(10) Patent No.: US 8,385,663 B2
(45) Date of Patent: Feb. 26, 2013

(54) VIDEO SEGMENTATION

(75) Inventors: Li-Qun Xu, Ipswich (GB);
Arasanathan Anjulan, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 13/203,685

(22) PCT Filed: Feb. 27, 2010

(86) PCT No.: PCT/GB2010/000353
§ 371 (c)(1),
(2), (4) Date: Aug. 26, 2011

(87) PCT Pub. No.: WO2010/097599
PCT Pub. Date: Sep. 2, 2010

(65) Prior Publication Data
US 2011/0317982 A1    Dec. 29, 2011

(30) Foreign Application Priority Data
Feb. 27, 2009 (EP) .................................. 09250566

(51) Int. Cl.
*G06K 9/62* (2006.01)
(52) U.S. Cl. .................. 382/225; 382/181; 382/224
(58) Field of Classification Search .................. 386/241; 382/181, 224–227; 715/731
See application file for complete search history.

(56) References Cited

U.S. PATENT DOCUMENTS 5,832,182 A * 11/1998 Zhang et al. .................... 706/50
6,366,286 B1 * 4/2002 Hermanson .................... 345/473
6,573,907 B1 * 6/2003 Madrane ....................... 715/719
(Continued)

FOREIGN PATENT DOCUMENTS
WO    WO 2007/113458    10/2007

OTHER PUBLICATIONS

Ming Li and Baozong Yuan, "2D-LDA: A statistical linear discriminant analysis for image matrix," Institute of Information Science, Beijing Jiaotong Uuniversity, Beijing, China, Aug. 2004, pp. 527-532.

(Continued)

*Primary Examiner* — Thai Tran
*Assistant Examiner* — Mishawn Dunn
(74) *Attorney, Agent, or Firm* — Nixon & Vanderhye P.C.

(57) ABSTRACT

A method of segmenting a sequence of video images according to scene activity, the method comprising: defining a first series of nodes in a first multi-dimensional space, each node corresponding to an image of the sequence of video images; defining a transformation function that maps each of the first series of nodes to a corresponding node in a second multi-dimensional space having a lower dimensionality than the first multi-dimensional space; applying said transformation function to each of the first series of nodes to define a second series of respective nodes in the second multi-dimensional space; applying a data clustering algorithm to the second series of nodes to identify clusters of nodes within the second multi-dimensional space, the data clustering algorithm being constrained by a measure of feature distance between a pair of clusters of nodes and a measure of temporal distance between the pair of clusters of nodes; determining a representative image from each cluster of nodes and plotting each representative image with respect to a measure of the elapsed time of the sequence of video images to form an scene density curve indicating the underlying scene change activities; and segmenting the sequence of video images in accordance with local minima and/or maxima of the scene density curve.

11 Claims, 16 Drawing Sheets

U.S. PATENT DOCUMENTS

| | | | |
|---|---|---|---|
| 7,383,509 B2* | 6/2008 | Foote et al. | 715/731 |
| 2004/0170321 A1 | 9/2004 | Gong et al. | |

OTHER PUBLICATIONS

Chi-Chun Lo and Shuenn-Jyi Wang, "A histogram-based moment-preserving clustering algorithm for video segmentation," Institute of Information Management, National Chiao-Tung University, 1001 Ta Hsueh Road, Hsinchu, Taiwan, Jul. 2001, pp. 2209-2218.

SiBao Chen et al., "Two-Dimensional LPP for Image Recogniation," Key Lab of Intelligent Computing & Signal processing of Ministry of Education, Anhui University, Hefei, China, International Conference on Intelligent Computing, Aug. 23-26, 2005, pp. 1159-1168.

Andrew Y. Ng, CS Division, U.C, Berkeley, Michael I, Jordan, CS Div. & Dept. of Stat., U.C. Berkeley, and Yair Weiss, School of CS & Engr., The Hebrew University, "On Spectral Clustering: Analysis and an algorithm," (2002), 8 pp.

P. N. Belhumeur et al., "Eigenfaces vs. Fisherfaces: Recognition using class specific liner projection," IEEE Trans. on Pattern Analysis and Machine Intelligence (PAMI), 19(7):711-720, 1997.

C. J. C. Burges, "Geometric methods for feature extraction and dimensional reduction—a guided tour," In The Data Mining and Knowledge Discovery Handbook, 59-92, 2005.

D. Gatica-Perez et al., "Assessing scene structuring in consumer videos," Proc. of CIVR'04, Dublin, 2004.

A. Hanjalic and HongJiang Zhang, "An integrated scheme for automated video abstraction based on unsupervised cluster-validity analysis," IEEE Trans. on CSVT, 9(8):1280-1289, Dec. 1999.

X. He and P. Niyogi, "Locality preserving projections," In Advances in Neural Information Processing Systems 16, MIT Press, Cambridge, MA 2004.

X. He et al., "Face recognition using laplacianfaces," IEEE Trans. on PAMI, 27(3):328-340, 2005.

P. Indyk, "On approximate nearest neighbors in non-euclidean spaces," Proc. of 39th Annual Symposium on Foundations of Computer Science (FOCS '98), Nov. 1998, Palo Also, CA, 148-155.

A. K. Jain et al., "Data clustering: a review," ACM Computing Survey, 31(3), 264-323, 1999.

A. Joshi et al., "On fuzzy clustering and content-based access to networked video databases," Proc. of the Workshop on Research Issues in Database Engineering (RIDE '98), p. 42, Washington, DC, USA, 1998. IEEE Computer Society.

Y. Li et al., "An overview of video abstraction techniques," Tech. Report HPL-2001-191, Jul. 2001, Imaging Systems Laboratory, HP Laboratories Palo Alto.

J. M. Odobez et al., "On spectral methods and the structuring of home videos," IDIAP-RR 02-55, Nov. 2002. (ftp://ftp.idiap.ch/pub/reprots/2002/rr02-55.pdf).

L. K. Saul and S. T. Roweis, "Think globally, fit locally: Unsupervised learning of low dimensional manifold," Journal of Machine Learning Research, 4:119-155, 2003.

J. Vendrig and M. Worring, "Systematic evaluation of logical story unit segmentation," IEEE Trans. on Multimedia, 4(4), Dec. 2002.

J. Yang et al., "Two-dimensional pca: A new approach to appearance-based face representation and recognition," IEEE Trans. on PAMI, 26(1):131-137, 2004.

D. Zhang et al., "Semantic video clustering across sources using bipartite spectral clustering," Proc. of ICME '2004, 117-120, 2004, Taiwan.

X. Zheng et al., "Locality preserving clustering for image database," Proc. of the 12th annual ACM international conference on Multimedia, 2004.

Graves et al., "Surveillance video indexing with iconic patterns of activity," The IEEE International Conference on Visual Information Engineering, Apr. 6, 2005, pp. 409-416.

Li-Qun Xu and Arasanathan Anjulan, "Relating 'Pace' to Activity Changes in Mono- and Multi- Camera Surveillance Videos," paper given at the 6th IEEE International Conference on Advanced Video and Signal Based Surveillance, Genoa, Italy, Sep. 2-4, 2009, pp. 104-109.

A. K. Jain et al., "Data Clustering: A Review," pp. 264 to 323 of ACM Computing Surveys, vol. 31, No. 3, Sep. 1999.

A. Hanjalic and Li-Qun Xu, "Affective Video Content Representation and Modeling," pp. 143-154 of IEEE Transactions on Multimedia, vol. 7, No. 1, Feb. 2005.

Li-Qun Xu and Bin Luo, "Appearance-based Video Clustering in 2D Locality Preserving Projection Subspace," pp. 356-363 of CIVR '07, Jul. 9-11, 2007.

Jeroen Vendrig and Marcel Worring, "Systematic Evaluation of Logical Story Unit Segmentation," pp. 492-499 of IEEE Transactions on Multimedia, vol. 4, No. 4, Dec. 2002.

Tao Xiang and Shaogang Gong, "Activity Based Surveillance Video Segmentation," Department of Computer Science, Queen Mary, University of London, UK, 2 pgs. (date unknown).

Xin, Z. et al., "Locality preserving clustering for image database" Proceedings of the 12th ACM International Conference on Multimedia, pp. 885-891, (Oct. 10-16, 2004).

Alan, H. et al., "An Integrated Scheme for Automated Video Abstraction Based on Unsupervised Cluster-Validity Analysis", IEEE Transactions on Circuits and Systems for Video Technology, vol. 9, No. 8, pp. 1280-1289, (Dec. 1999).

Xiaofei, H. et al., "Locality Preserving Projections", Computer Science, pp. 1-8, (2002).

Kokiopoulou, E. et al., "Orthogonal Neighborhood Preserving Projections", 5th IEEE International Conference on Data Mining, pp. 234-241, (Nov. 27, 2005).

Sun, X. et al., "Video Summarization Using R-Sequences", Real-Time Imaging, vol. 6, No. 6, pp. 449-459, (Dec. 2000).

International Search Report for PCT/GB2007/000594 mailed Mar. 30, 2007.

International Search Report for PCT/GB2010/000353, mailed Jun. 7, 2010.

Graves, A. et al., "Surveillance video indexing with iconic patterns of activity", The IEEE International Conference on Visual Information Engineering, (Apr. 6, 2005), pp. 409-416.

* cited by examiner

A comparison between the results of two independent approaches: (a) the present scene activity segmentation and (b) the proven platform congestion level estimation in Error! Reference source not found. for the same 9'32" long surveillance video.

The analysis results of a second morning rush hours platform video of 7 minutes and 7 seconds long: A Kaiser filter of $l=40s$, $\beta=0.5$ is used to smooth both the scene change density and congestion estimation curves. The number of key frames obtained from the video summarisation process is 94.

The analysis results of an evening rush hours traffic video of 7 minutes and 21 seconds long. A Kaiser filter of $l=40$s and $\beta=0.5$ is used to smooth both the scene change density (a) and congestion rating (b) curves. The number of key scene frames in (a) is 78.

The analysis results of a second evening rush hours traffic video of 6 minutes and 46 seconds long. A Kaiser filter of $l=40s$ and $\beta=0.5$ is used to smooth both the scene change density (a) and congestion rating (b) curves. The number of key scene frames in (a) is 66.

A snapshot of four views of an Airport forecourt check-in area scene captured by a synchronised camera network; the woman donning an orange jacket is marked in ellipse who can be seen from different angles at different sizes.

Camera 1

Camera 2

Camera 3

Camera 4

Analysis results for an airport check-in desk area as seen from Camera-1: The scene change density curve is computed based on 86 key frames automatically extracted from an 18'24" long concatenated video.

(a) Kaiser filter $l=40s$, $\beta=0.5$ (b) Kaiser filter $l=120s$, $\beta=0.5$

Analysis results for an airport check-in desk area as seen from Camera-2: The scene change density curve is computed based on 52 key frames automatically extracted from an 18'24" long concatenated video.

A sample frame of an airport check-in desk area in a multi-view mosaic video form: (a) for Camera-1 & 2, and (b) all the 4 cameras.
Note the difference in depth of field, view angle, quality of the colour imaging, etc, exhibited by each camera.

(a)

(b)

Analysis results for an airport check-in desk area as seen from a mosaic view of Camera-1 & -2: The scene change density curve is computed based on 56 temporally distributed key frames automatically extracted from an 18'24" long concatenated video.

(b) Kaiser filter $l=120s$, $\beta=0.5$ (a) Kaiser filter $l=40s$, $\beta=0.5$

Analysis results for an airport check-in desk area as seen from a mosaic view of all four cameras: The scene change density curve is computed based on 56 temporally distributed key frames automatically extracted from an 18'24" long concatenated video.

Sample frames of the scene corresponding to the instants s1, s2, and s3, shown in Figure(b), of an 18'24" long mosaic video captured by four synchronised cameras.

S1

S2

S3

VIDEO SEGMENTATION

This application is the U.S. national phase of International Application No. PCT/GB2010/000353 filed 26 Feb. 2010, which designated the U.S. and claims priority to EP Application No. 09250566.8 filed 27 Feb. 2009, the entire contents of each of which are hereby incorporated by reference.

This invention relates to methods of segmenting a sequence of video images, and in particular segmenting a sequence of automatically captured video images according to the level of scene activity portrayed. The general objective of video summarisation is to generate a storyboard that provides a user with the means to be able to quickly browse the content of a longer video program, for example a news broadcast, a feature movie or a home movie, in a meaningful way. In a production video, such as news broadcasts, feature movies, there are typically portions of video captured from different cameras (i.e. different view points of the same scene) and portions of video captured from different physical sites or scenes. The finished video tends to have well defined semantics and stories that are intentionally composed. This tends to allow the video program to be relatively easily summarised starting from analysing camera breaks. Reference 2 discusses such issues. In contrast, in the case of surveillance video monitoring (such as closed circuit television) the video footage is typically captured by one or more fixed view point cameras in a passive monitoring fashion. In other words, the physical site or scene frame is fixed and the viewpoint of the camera is either static or very restrained in movement. This type of video program is much more difficult to summarise. Furthermore, video segmentation aims to identify the starting and ending time of a video segment that contains some consistent characteristic, just as story or activity, etc. Since surveillance video contains no natural camera breaks, it is again much harder for an automated computer program to perform segmentation. Home movies (or user videos) tend to fall between these two extremes—and so may suffer many of the difficulties of surveillance video when it comes to automating segmentation, and embodiments of the present invention find application in segmenting such video material.

International patent application WO 2008/093321 A1 (Method and system for video indexing and synopsis) discloses a method and system for generating a video synopsis of a surveillance video. This document describes an object-centred approach in which the path of moving objects is extracted whilst redundant temporal and spatial data are discarded, so that the moving objects form a three dimensional spatial/temporal "tube" within an image. Whilst this approach provides a synopsis of the movement of a particular object within a sequence of video frames, it does not provide a summarisation of the video sequence according to the overall level of scene activity as a whole. The paper "Activity Based Surveillance Video Segmentation" by Tao Xiang and Shaogang Gong published on the 24 Mar. 2004 in the proceedings of the British Machine Vision Conference discusses a method of surveillance video segmentation that is based on automatic event detection and classification without object-centred tracking. However, the method proposed in this paper requires the system to be trained to determine the number of event classes using automatic model order selection, so that there is prior knowledge of the events which will make up the sequence of events in the videos which will subsequently be segmented. Consequently, the method proposed in that paper is not applicable to general surveillance video in which there is no prior knowledge of events, and hence no facility to train the system based on exposure to known events.

International patent application WO 2007/113458 teaches a method for processing video data defining a series of images, comprising the steps of: defining a first series of nodes in a first multidimensional space, each of the first series of nodes corresponding to an image of the series of images and its location in the first space being defined in dependence on features of the respective image; defining a transformation function that maps each of the nodes in the first multidimensional space on to a respective node in a second multidimensional space having a lower dimensionality than the first multidimensional space, in such a way that neighborhood relationships between nodes in the first multidimensional space are preserved between the respective nodes in the second multidimensional space; defining a second series of nodes in the second multidimensional space, each of the second series of nodes corresponding to one of the first set of nodes and its location in the second multidimensional space being defined in accordance with the transformation function; and performing a clustering analysis in dependence on the nodes of the second multidimensional space to identify clusters of nodes therein. The pre-characterising clause of claim 1 is based on this disclosure.

It is an aim of embodiments of the present invention to segment a sequence of video images, typically surveillance video data, on the basis of changes in scene activity within the "footage".

According to a first aspect of the present invention there is provided A method of segmenting a sequence of video images according to scene activity, the method comprising:

defining a first series of nodes in a first multi-dimensional space, each of the first series of node corresponding to an image of the series of images and its location in the first space being defined in dependence on appearance components of the respective image;

defining a transformation function that maps each of the first series of nodes to a corresponding node in a second multi-dimensional space having a lower dimensionality than the first multi-dimensional space in such a way that neighborhood relationships that exist between the nodes in the first multi-dimensional space are preserved between the respective nodes in the second multidimensional space;

applying said transformation function to each of the first series of nodes to define a second series of respective nodes in the second multi-dimensional space;

applying a data clustering algorithm to the second series of nodes to identify clusters of nodes within the second multi-dimensional space, the data clustering algorithm being constrained by a measure of feature distance between a pair of clusters of nodes and a measure of temporal distance between the pair of clusters of nodes;

determining a representative image from each cluster of nodes and plotting each representative image with respect to a measure of the elapsed time of the sequence of video images to form an scene density curve indicating the underlying scene change activities, the scene density value for each representative image being inversely related to the time interval between that image's neighboring representative images (e.g., crowd movements such as converging or dispersing); and segmenting the sequence of video images in accordance with local minima and/or maxima of the scene density curve.

The data clustering algorithm preferably includes computing the measure of feature distance and the measure of temporal distance between pairs of nodes, selecting a pair of nodes and determining if the measure of temporal distance between the selected nodes is within a temporal threshold value.

Additionally, if the measure of temporal distance is within the temporal threshold value then the method may further comprise further determining if the measure of feature distance between the selected nodes is within a feature distance threshold value.

Additionally, if the measure of feature distance is within the feature distance threshold value then the method may further comprise merging the selected nodes to form a new single node.

Alternatively, if the measure of temporal distance exceeds the temporal threshold value then the method may comprise selecting a further pair of nodes. The pairs of nodes are preferably selected in ascending order of feature distance.

Preferably, the scene density curve is smoothed by application of a filter. The filter preferably has a window length. The filter window length may be selected in dependence on one or more of the duration of the sequence of video images and the average duration of scene activity within the video images. The filter preferably comprises a Kaiser filter.

According to a further aspect of the present invention there is also provided a video processing system comprising a source of a sequence of video images and a data processor arranged to process the video images according to the method of the first aspect of the present invention.

Embodiments of the present invention will now be described below, by way of illustrative example only, with reference to the accompanying figures, of which:

FIG. 1 schematically illustrates a method of video segmentation according to embodiments of the present invention;

FIG. 2 schematically illustrates the method of dimensionality reduction by determining and applying a non-linear subspace mapping, the 2D-LPP;

FIG. 3 schematically illustrates a clustering algorithm according to an embodiment of the present invention;

FIG. 4 illustrates a scene change density curve obtained by the present invention; and FIG. 5 illustrates the curve of FIG. 4 after the application of a Kaiser filter.

FIGS. 6(a)-(f) show snapshots of an operational underground platform video.

FIGS. 8(a)-(b) illustrate another example of a platform scene activity analysis result.

FIGS. 9(a)-(b) and FIGS. 10(a)-(b) illustrate comparative results for two more underground platform video clips captured in two different week days, respectively.

Figure 11:
Figure 11:
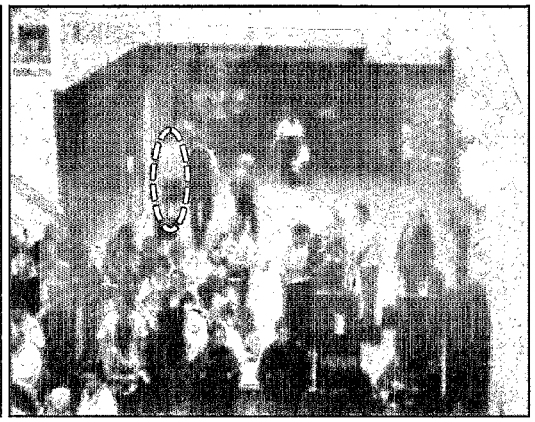
Figure 11:
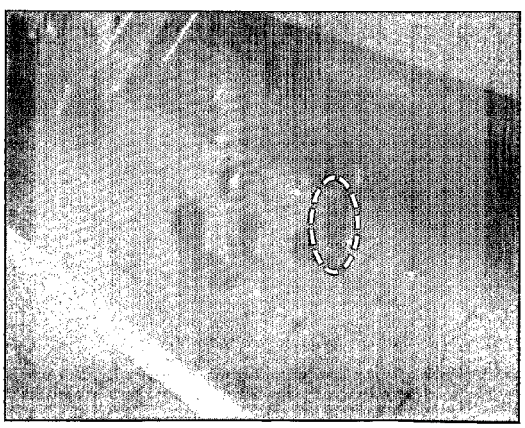
Figure 11:
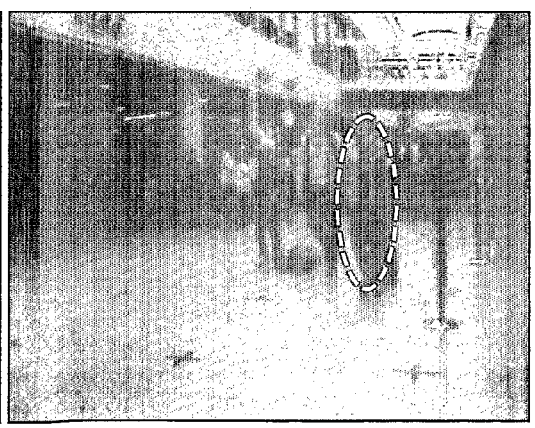

FIG. 11 show one sample frame from each of four cameras obtained at the same temporal position.

FIGS. 12(a)-(b) and 13(a)-(b) illustrate, for camera-1 and -2, respectively, a scene activity density curve obtained when applying two Kaiser Filters of the same shape parameter but different time lengths.

FIGS. 14(a)-(b) illustrate original frames side by side for two cameras and all four cameras, respectively.

FIGS. 15(a)-(b) and FIGS. 16(a)-(b) illustrate scene activity curves, with marked positions of key frames, for the two-view and four-view monitoring scenarios, respectively.

Figure 16:
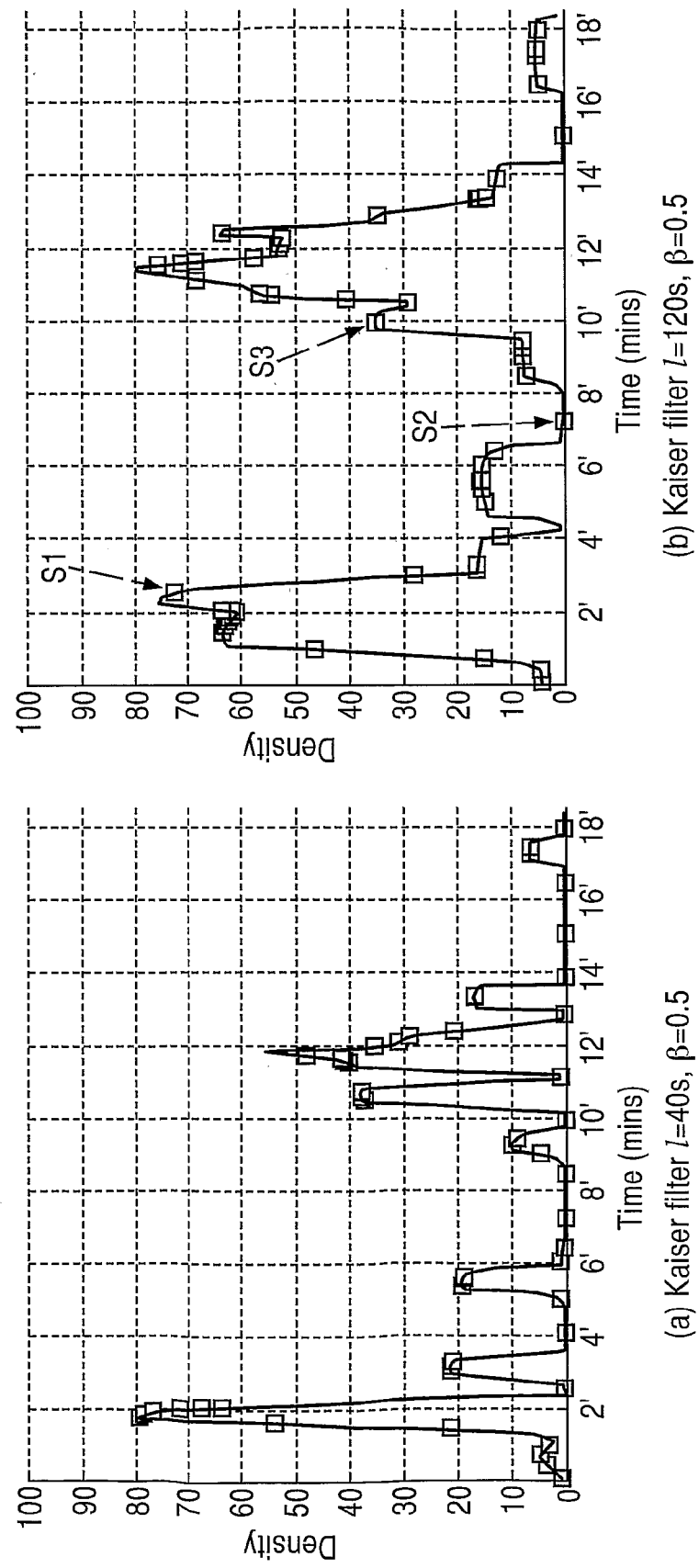
Figure 17:
Figure 17:
Figure 17:

FIG. 17 show three snapshots corresponding to respective moments marked in FIG. 16(b)

Figure 1:
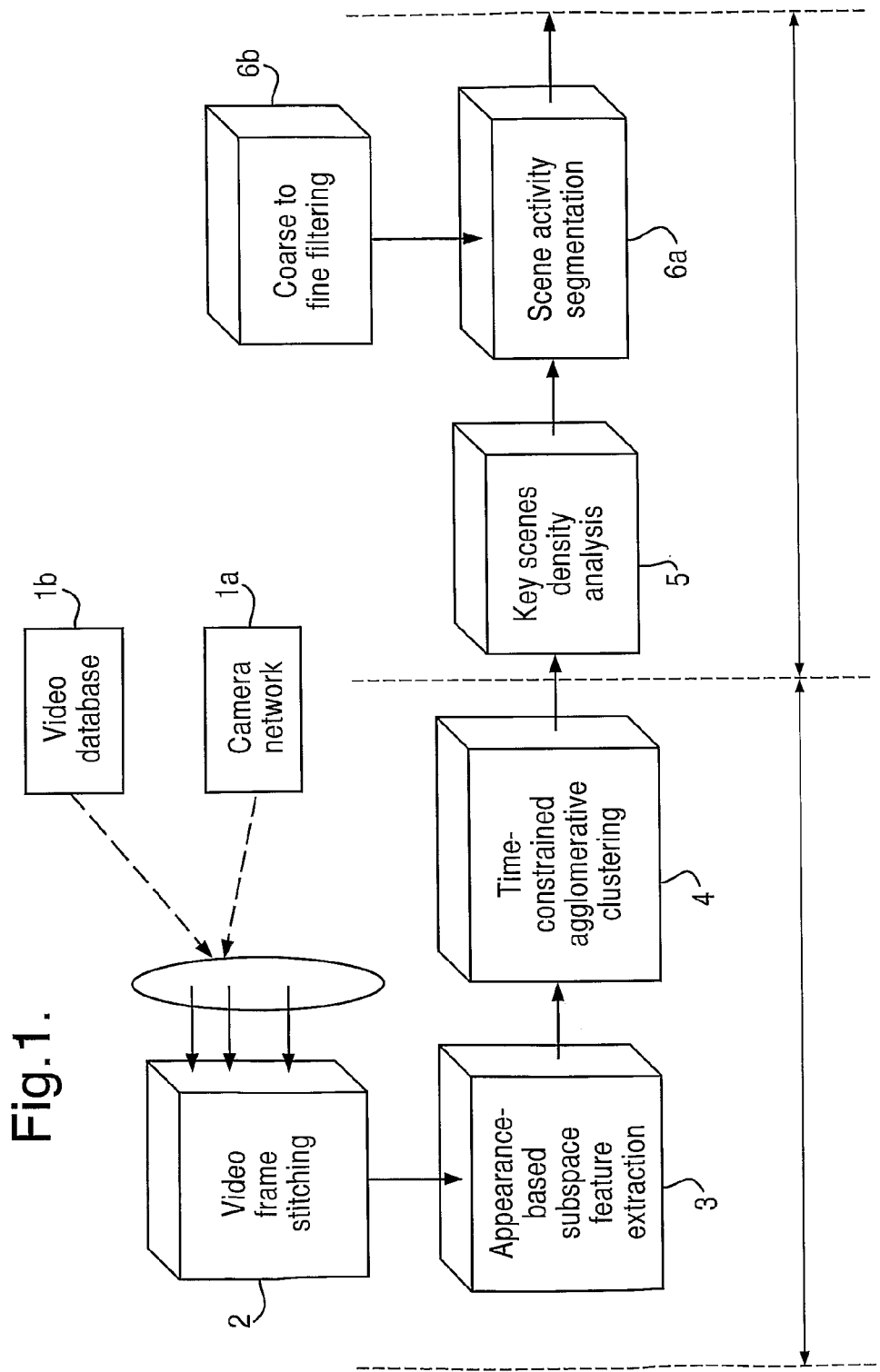

FIG. 1 is a schematic diagram illustrating the main processes within a video segmentation method according to an embodiment of the present invention. Source video data is provided as the input to the system. The source video data may be provided from a camera network 1a, which may comprise a single video camera or a number of synchronised cameras. In the latter arrangement the multiple cameras will typically be fixed-view cameras and will each be directed at a different aspect of the same scene, for example providing views of a single space from different directions and/or viewing angles. In this case the output video streams from each of the cameras will be combined together in a mosaic image (for example by split screen techniques) by a video frame stitching process 2 to provide a single input video data stream. Alternatively, the input video data may be provided as recorded video data from a suitable database or storage device 1b. The input sequence of video images 1 are subsequently subjected to a sub-sampling process (not shown in FIG. 1) in order to remove data redundancy and make the subsequent processes more efficient and computationally manageable. The sub-sampling process may include one or more of temporal down sampling, spatial sub-sampling and colour conversion. Other sub-sampling procedures may also be utilised within embodiments of the present invention. The temporal sub-sampling may conveniently be done by removing some of the frames of the video sequence, for example reducing the original frame rate of typically 25 frames per second (FPS) down to 2 FPS by alternatively selecting every twelfth and thirteenth frame only. The level of data reduction at this stage may be selected depending on characteristics of the video sequence: for instance depending on the average duration of typical events of a surveillance site in question. The spatial sub-sampling may conveniently be done by reducing the resolution of the input video stream. For example, the frame size may be reduced by a factor of 4. Colour conversion may also be accomplished by, for example, converting the video data to greyscale or illuminance data only.

The output of the sub-sampling process, which will be an image sequence of N frames, can be considered as a set of N data points drawn from an (m×n)-dimensional random image space. This image space is then subject to an appearance based subspace feature extraction process 3 involving dimensional reduction to produce a further image space of (d×d)-dimensions, where d<<m, n. In preferred embodiments this is accomplished by applying a transformation function to the first image space (m×n) that projects the nodes of the first image space to a corresponding node in the second, reduced dimensionality, image space (d×d). This feature extraction process is described in more detail below.

After obtaining the feature data set in the second, lower, multi-dimensional image space, a time constrained agglomerative clustering process 4 is performed to identify representative data clusters in this image space. This can readily be done with a classic data clustering method, such as a partitioning algorithm, for example abK-means method or a hierarchical agglomerative data clustering algorithm. In preferred embodiments of the current invention, a hierarchical algorithm is chosen due to its adaptive determination of number of clusters. However, in preferred embodiments two modifications are introduced to the clustering algorithm; an inter-cluster similarity measure and a time constraint. Having identified individual clusters of video frames, the feature data point (or its corresponding image) that is closest to the centroid of each cluster is chosen as the key frame of that data cluster. The selected key frames are then sorted according to their frame index numbers so as to put them in the order in which they appeared in the original video stream, i.e. in temporal order. The process steps up to and including clustering together constitute summarisation of the original video data. Background information on data clustering can be found in reference 3.

Figure 4:
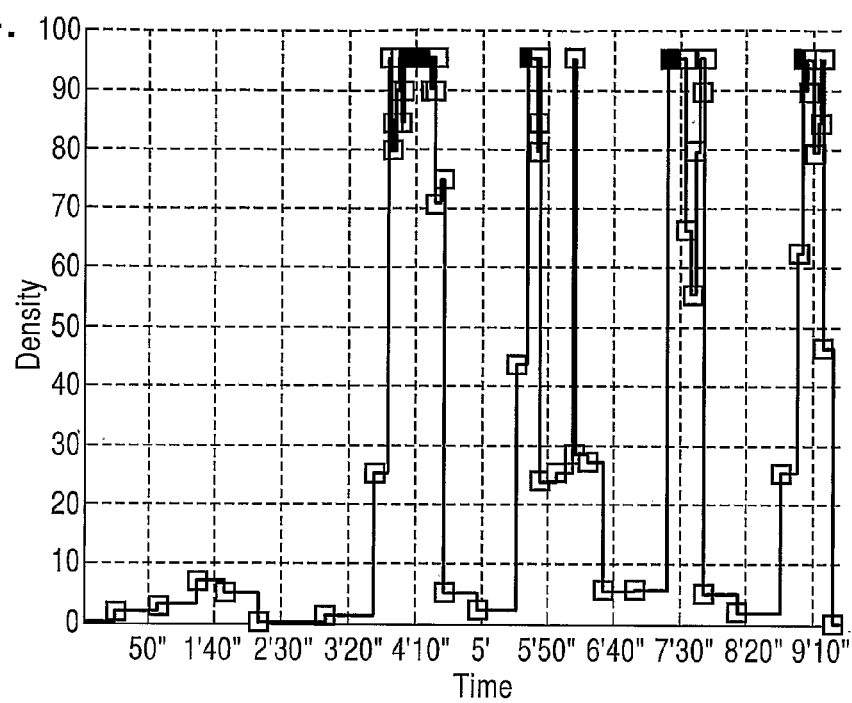

Subsequent to the clustering process 4 the extracted key frames are used to generate a density curve (block 5) to provide an indication of the frequency with which the dynamic scene activity changes. The sequentially ordered key frames represent a summary of representative scenes/events of the original surveillance video and also show the order and instance at which times the events take place. The distribution of the key frames extracted along the timeline reveals the underlying scene activity changes in a continuous fashion. For example, when key frames occur more often in time, it tends to suggest that some more active transitions are taking place in the scene; otherwise, the scene would appear largely the same, with a need for only a few representative frames. In embodiments of the present invention the density curve is used to analyse the probabilistic distribution of extracted key scene frames in the temporal space to facilitate discovering the underlying scene activity changes on a large time scale. In preferred embodiments the density curve is calculated as follows:

$$C_i = 100\exp\left[\frac{1-(s(k+1)-s(k))}{\delta}\right], s(k) < i < s(k+1)$$

where s(k) and s(k+1) are the positions (frame indexes) of the two adjacent key scene frames to the left and right of a frame i respectively. The parameter $\delta$ is a constant determining the way the density value $c_k$ is distributed on a scale between 0% and 100%, with $\delta$ normally selected as a factor of the maximum distance (in frame number) between two adjacent key scene frames. FIG. 4 shows an example density curve obtained for 9 minutes and 32 seconds of video data. As can be seen from the equation above and FIG. 4, the density curve is typically a step function, which takes a value at each step which is inversely related to the time interval (in frames) between its two neighboring key frames. The shorter the interval, the higher is the value of C. In FIG. 4 each key frame is represented as a square point on the graph. The rather step-like nature of the density curve shown in FIG. 4 is not ideally suited to longer term activity analysis in videos—some smoothing would improve this. In preferred embodiments of the present invention the density curve is smoothed (block 6b) to remove the sudden jumps and spikes (visible in FIG. 4) that may be due to erroneous detection of key frames, noise or some rapid changes in visual content. In general, we are more interested in long term activities/trends than in sudden, abrupt changes. A preferred smoothing technique is to apply a Kaiser filter K(l,β), where l=length (window size) and β=a shape parameter. A Kaiser filter can be defined by the following equation:

$$\tilde{C}_i = \frac{\max(C_i)}{\max(C_i \otimes K(l,\beta))}(C_i \otimes K(l,\beta)) \tag{B}$$

Figure 5:
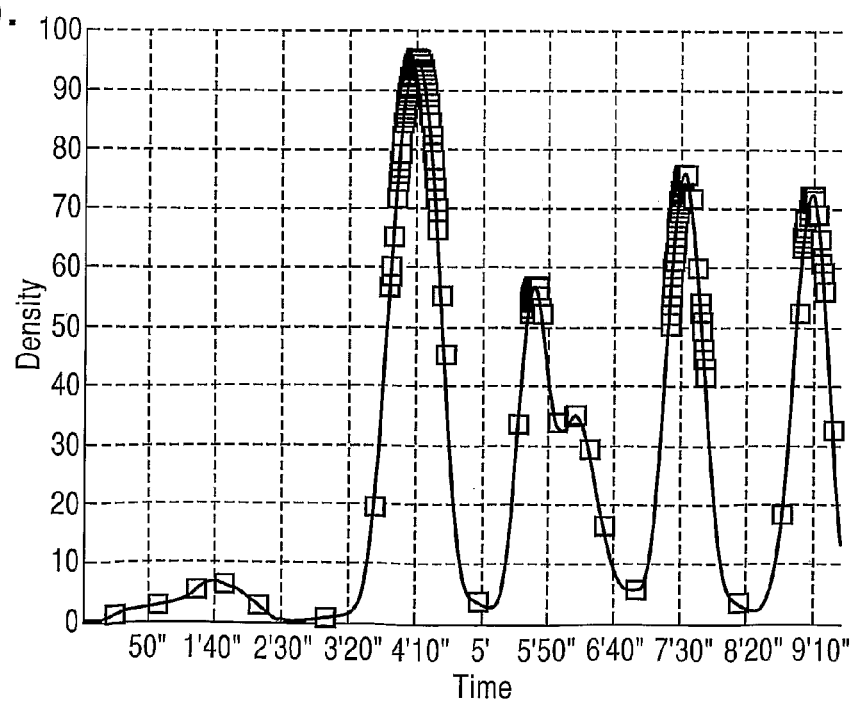

FIG. 5 illustrates the result of applying a Kaiser filter to the original density curve illustrated in FIG. 4, with l=40 seconds and β=5 seconds. From experimentation the present applicants have determined that changes in the shape parameter β do not greatly influence the shape of the resulting smooth density curve. However, the filter length l plays a more significant role in shaping the smoothed curve. A larger smoothing window, of greater length, tends to remove considerably more unwanted local changes or fluctuations, whilst retaining the main trend in the density curve, whilst a smaller smoothing window tends to keep more local changes. Therefore, suitable consideration needs to be given to the choice of the Kaiser filter window size that is compatible with the time scale of the typical scene activities occurring within the captured original surveillance video. From the smoothed density curve it is subsequently relatively easy to identify the video segments of distinctly perceived scene activities and their transitions (block 6a). For example the peaks in FIG. 5 will be representative of high scene activity, for example crowd movements on a train platform, whilst the troughs correspond to relatively little scene activity, such as a train platform with no train and few or no people present. The scene density analysis and activity segmentation processes together constitute video segmentation.

Figure 2:
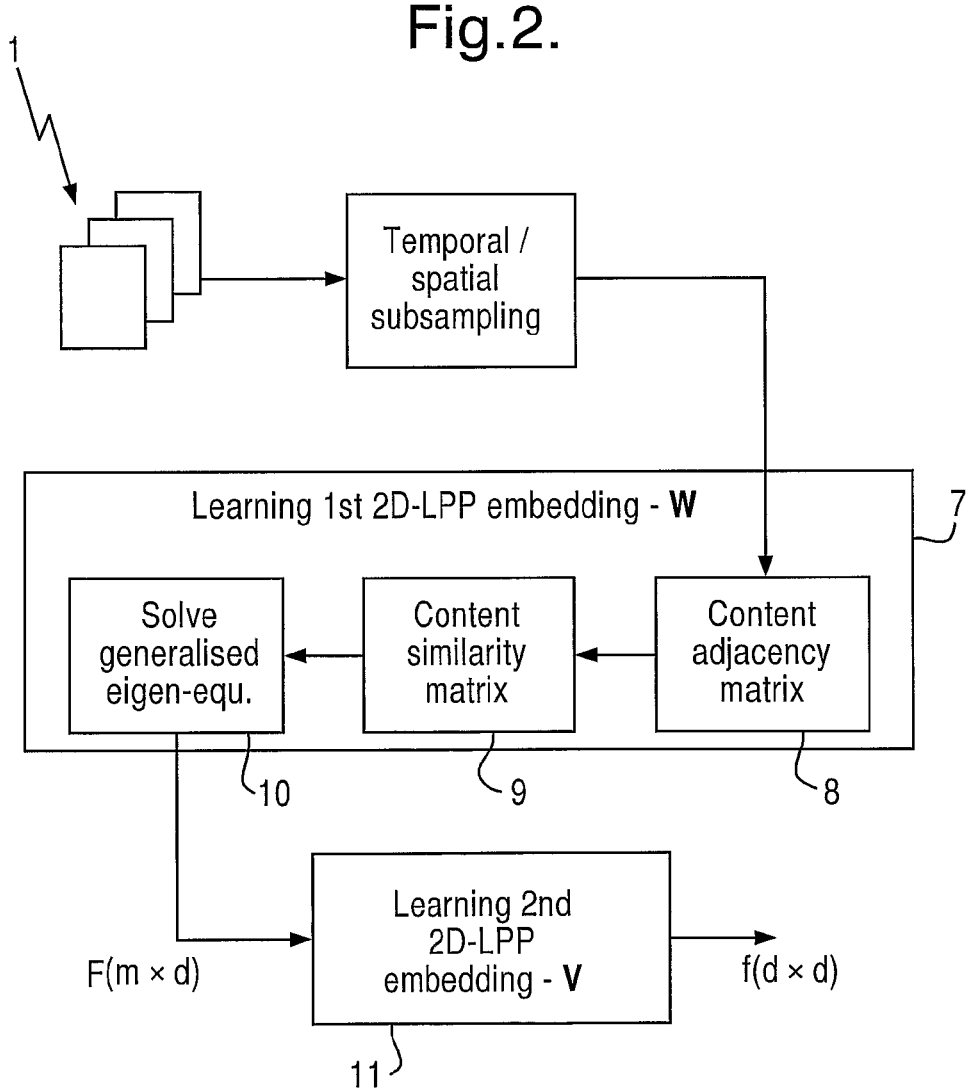

In embodiments of the present invention each frame, or image, output from the sub-sampling process is converted by known techniques to a corresponding matrix, with each data element in the matrix corresponding to a pixel value or some other metric of the image. Each matrix can be represented as a node within a first multi-dimensional space, the number of dimensions being equal to the number of data elements within each matrix. The pixel or feature metrics may be selected depending on the implementation. They can include mapping of RGB colour image pixels, edge mappings, colour histograms and texture mappings. It is these nodes in the first multi-dimensional space that are then subjected to one or more transformations to reduce their dimensionality, whilst preserving the neighborhood relationships between nodes. The 'neighborhood relationship' is in a space topological sense, which means that if some data points (e.g., feature vector of individual images) in the high-dimensional space (e.g., 1000 dimension) are located relatively close or far away, then these points, after manifold learning/projective transformation, being projected to a low-dimensional space (e.g., 25-dimension), should hold the same kind of relations relative to each other in terms of closeness or distance. The transformation function may be any known dimensionality reduction function having the property of maintaining neighbour relationships. However, in preferred embodiments of the present invention the transformation function is preferably the known 2D-LPP (2D Locality Preserving Projections) function, further details of which can be found in reference 1. FIG. 2 is a schematic diagram illustrating two 2D-LPP transformation matrices (sometimes called sub-space embeddings) learned in tandem according to embodiments of the present invention. As previously noted with reference to FIG. 1, the input video sequence number 1 first undergoes temporal and spatial sub-sampling and conversion to nodes (matrices) in a first (m×n)-dimensional random image space $I^{m \times n}$. This is provided as an input to the first 2D-LPP sub-space learning block 7 (FIG. 2) and is used as the basis for learning the first 2D-LPP sub-space and deriving the required transformation matrix to transform the nodes to a second, intermediate, (m×d) multi-dimensional space. The 2D-LPP sub-space learning block 7 includes three sub-blocks. Block 8 builds a content adjacency graph, or a sparse binary matrix, based on the content distance metric between pair-wide images that also satisfies a neighborhood size and a temporal distance (in frame) constraint. Block 9 computes a similarity value for each pair of connected nodes using a well-defined similarity measure. Block 10 uses the outputs of blocks 8 and 9 to formulate and solve a generalised Eigen-equation, which results in the first embedding (transformation) matrix W. Applying W to each of video frame generates a feature matrix sequence F(m×d). In an analogous fashion, a second embedding matrix V is generated at block 11 from the transformed version of the first feature matrix sequence F(d×m), which results in a second feature matrix sequence f(d×d) in a third (d×d) multi-dimensional space, where d is the dimensionality of the 2D-LPP sub-space and d<<m and d<<n. The processes illustrated in FIG. 2 represent the learning phase where the transformations are learned. The transformations are then subsequently applied to each of the frames (images) output from the sub-sampling procedure. The processes used in processor blocks 8, 9 and 10 to generate the 2D-LPP projections will be well known to those skilled in the art. They are described in more detail in, for example International patent application WO 2007/113458.

The significance of these 2D-LPP projections is that they allow the original multi-dimensional space to be transformed to a much reduced feature sub-space (which may for example be of dimensions 3×3), whilst preserving the locality, discriminative and structure information of the original image space. Such a reduced feature sub-space lends itself to more simple and effective data analysis in the subsequent processing steps.

Figure 3:
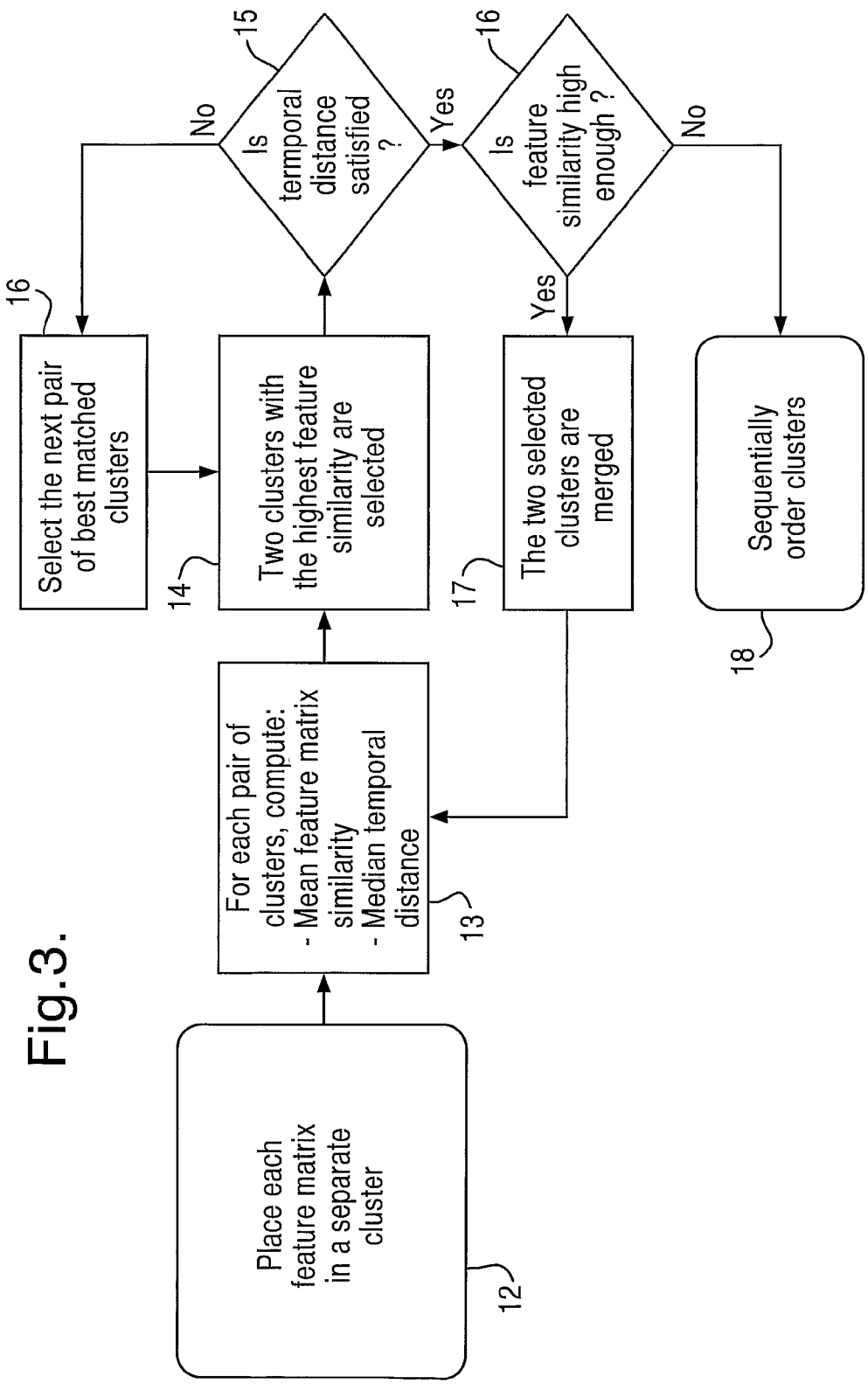

FIG. 3 schematically illustrates the clustering process 4 of FIG. 1. In preferred embodiments of the present invention a variant of hierarchical agglomerative data clustering is applied to discover the interesting grouping of the scenes or events over time. Referring to FIG. 3, each 2D-LPP feature matrix/vector (with its associated frame index), as output from the 2D-LPP embedding process 3 shown in FIG. 1, is placed in a separate cluster (block 12). In other words, at the beginning of the clustering process each video frame is represented by a single node in the reduced dimensional space and each frame/node forms a corresponding 'cluster'. For each pair of clusters their inter-cluster feature and temporal distance are computed (block 13). The cluster pairs are ordered in ascending order of feature similarity (inter-cluster feature distance) and the cluster pair with the highest feature similarity are subsequently selected (block 14). The temporal distance between the selected two clusters is then compared with a temporal distance threshold $T_t$ (block 15). If the temporal distance between the selected pair of clusters is greater than the temporal distance threshold $T_t$, indicating that the clusters are not from a similar point in the sequence of video images, the next pair of clusters according to feature similarity are selected (block 16). If the temporal distance between a selected pair of clusters is within the temporal distance threshold then a further comparison is made between the feature similarity of the selected pair and a further feature similarity threshold $T_f$ (block 16). If the feature similarity between the selected pair of clusters is within the similarity threshold then the two clusters are merged (block 17), i.e. a new cluster is formed containing all the nodes (frames) from the previous pair of clusters, and the clustering process restarted by re-computing the feature and temporal distances (block 13). If the similarity threshold is exceeded for a pair of clusters then the clustering process is terminated and the resulting number of clusters output sequentially ordered along a time line (block 18).

It will be appreciated that the choice of the two decision thresholds, the temporal distance threshold and feature similarity threshold, will have an impact on the outcome of the clustering process, which in turn will affect the result of the scene activity segmentation. The choice of these threshold parameters will vary depending upon the nature of the video sequence being analysed. However, possible threshold values include a temporal distance threshold of 100 frames and a feature matrix similarity threshold of 0.35.

This can be represented as follows:

Table 1

A Variant of Hierarchical Agglomerative Data Clustering Algorithm with Built-in Time Constraint for Sequential Events Discovery 1. Initialisation:
   Place each 2D-LPP feature matrix/vector (with its associated frame index) in a distinct cluster.
2. Iteration:
   (i) For each pair of clusters {a, b}, compute its inter-cluster feature and temporal distance as follows, $$D_{a,b}{}^f = (\overline{f}_a - \overline{f}_b)^T (\Sigma_a^{-1} + \Sigma_b^{-1})(\overline{f}_a - \overline{f}_b) \quad (1a)$$

$$D_{a,b}{}^t = |\overline{t}_a - \overline{t}_b| \quad (1b)$$

where $\overline{f}_a$, $\overline{f}_b$ and $\Sigma_a$, $\Sigma_b$ are the mean 2D-LPP features and their corresponding covariance matrices, and $\overline{t}_a$ and $\overline{t}_b$ are the median temporal positions, for clusters a and b, respectively. For computational efficiency, a diagonal covariance matrix, or variance, is used here;
   (ii) Sort the feature distance (proximity) in ascending order, find the most similar pair of clusters a* and b*, or having the least feature distance;
   (iii) If the temporal distance condition for clusters a* and b*, $D_{a*,b*}{}^t < \tau^t$, is satisfied ($\tau^t$ is a predefined temporal distance threshold), go to (iv). Otherwise, go to (ii) and find the next pair of most similar clusters, and repeat;
   (iv) If the feature distance condition $D_{a*,b*}{}^f < \tau^f$ is also met, then clusters a* and b* are merged. And for the merged cluster ab, its mean, $\overline{f}_{ab}$, and diagonal covariance matrix, $\Sigma_{ab}$, are computed in feature space, as well as the mean temporal distance, $\overline{t}_{ab}$, in temporal space:

$$\overline{f}_{ab} = \frac{1}{n} \sum_{k=1}^{n} f_k \quad (2a)$$

$$\overline{t}_{ab} = \frac{1}{n} \sum_{k=1}^{n} t_k \quad (2b)$$

$$\sum_{ab}^{i,j} = \begin{cases} \frac{1}{n-1} \sum_{k=1}^{n} (f_{k,i} - \overline{f}_{ab,i})^2 & \text{if } (i = j) \\ 0 & \text{if } (i \neq j) \end{cases} \quad (2c)$$

where, n is the number of features in the merged cluster; $\tau^f$ is a predefined feature distance (similarity) threshold; $\Sigma_{ab}{}^{i,j}$ is the (i,j)th element of the new covariance matrix $\Sigma_{ab}$.
   Repeat (i).
3. Otherwise, if the similarity constraint $D_{a*,b*}{}^f < \tau^f$ is not satisfied, the algorithm is terminated, which outputs a number of clusters distributed along the time domain.

Note that the choice of the two decision thresholds $\tau^t$ and $\tau^f$ will have a direct impact on the outcome of video clustering, or key frames extraction, which in turn affects the result of scene activity segmentation. This issue will be explained in the experimental studies section.

The method and system described above provide a meaningful means of video segmentation of status of different activity (or inactivity) present in a physical site or space under video surveillance. Thus it provides a user with a quick visual summary of representative scenes/events of a site under monitoring but crucially it also shows the order and instants at which times such a sequence of (atomic) events take place. The (dense or sparse) distribution of key scenes extracted along the timeline reveals the underlying scene activity changes in a continuous fashion.

EXPERIMENTAL STUDIES

In order to demonstrate the effectiveness of the approach to surveillance video summarisation and scene activity segmentation, a number of experiments were conducted on real-world video footages of mostly crowded public spaces captured by individual cameras as well as by a camera network monitoring the same site with certain overlapping field of views. We now discuss in detail the scenarios, datasets and operating parameters of the algorithms:

For single view videos we have tried underground platform scene as well as airport check-in desk area scene captured by one camera. For the former, a region of interest covering the platform area is specified; whilst for the latter the whole video frame within the camera's field of view is considered. For multi-view videos, the airport check-in desk area scene captured by two and four distributed cameras mounted in different locations is studied, respectively.

For single view videos, the original full rate 25 fps (frame per second) colour video is temporally down sampled to 2 fps and spatially sub-sampled to a frame size of 384× 288 pixels, the 2D-LPP appearance feature extraction then operates on the converted sequence of grey-level images that have a spatial resolution further reduced by a factor of 4 to 96×72 pixels.

For two-view videos, the two original full rate colour videos of resolution 768×576 are temporally down sampled to 2 fps and spatially reduced to a frame size of 192×144 pixels. The corresponding (from same temporal position) frames of the two videos are joined together side by side to obtain a new mosaic frame with a resolution of 384×144 pixels, the appearance feature extraction then operates on the converted grey-level images with a spatial resolution reduced further by a factor of 4 to 96×36 pixels.

For four-view videos, the original full rate colour videos are temporally down sampled to 2 fps with a reduced frame size of 192×144 pixels. The corresponding (from same temporal position) frames of the videos are then joined together to obtain a new mosaic frame with a resolution of 384×288 pixels, the appearance feature extraction then operates on the converted grey-level images with a spatial resolution reduced by a factor of 4 to 96×72 pixels.

For the video summarisation process to be carried out, the following exemplary set of parameter values were used: the subspace feature dimension d=5; the temporal distance threshold allowed for cluster merge is $\tau^t=100$ frames, or 50 seconds, and the feature matrix similarity threshold is $\tau^f=0.35$.

In the section on single view video below, we present experimental results for single view videos with respect to both an underground platform scene and an airport check-in desk area scene. The subsequent section discusses the results obtained for two- and four-view videos concerning the airport check-in desk area scene only.

Single View Video
Underground Platform Scenarios

Figure 6:
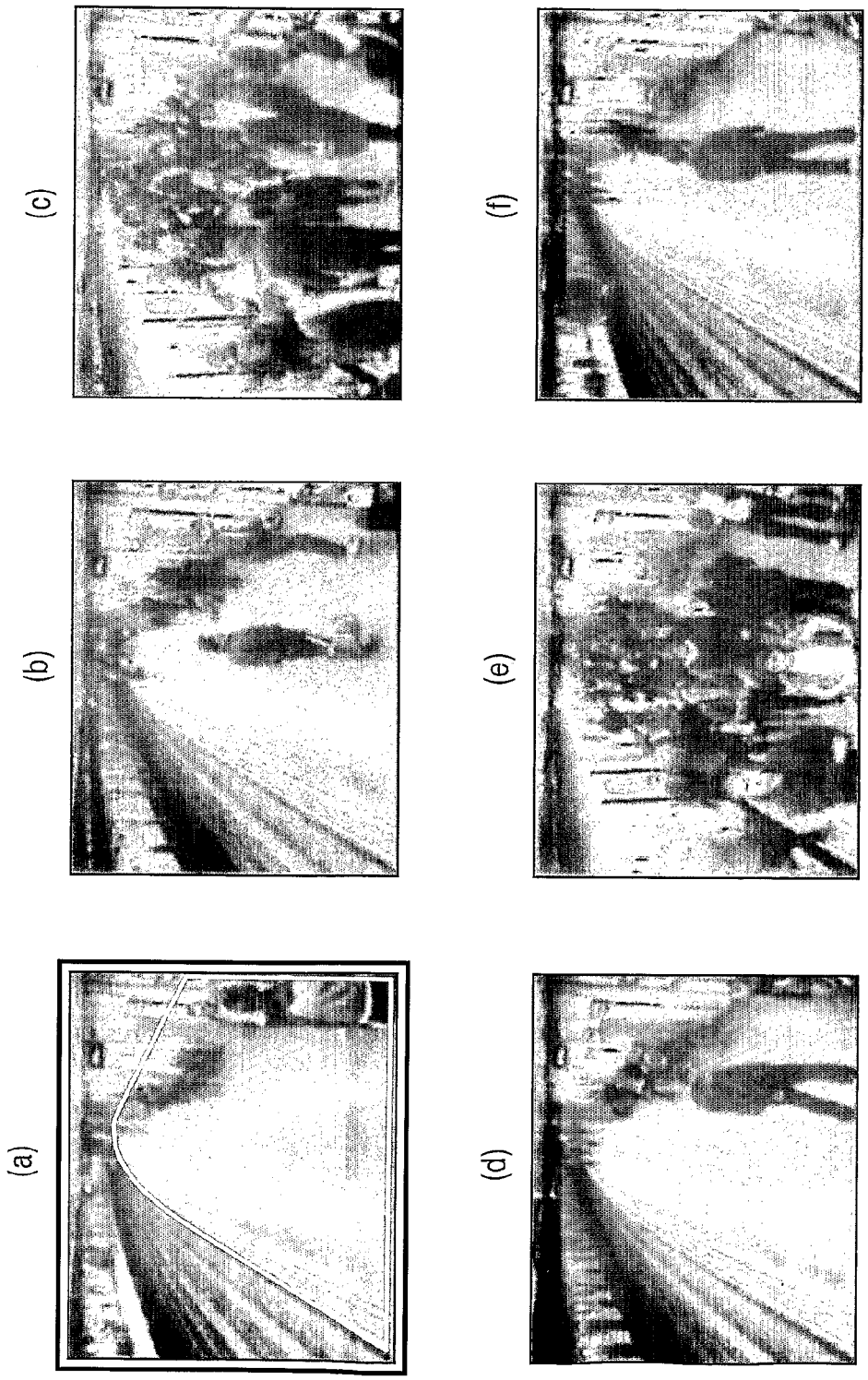

Snapshots of an operational underground platform video are shown in FIG. 6. The chosen platform region of interest (ROI) is specified in red in (a). This video lasts about 9 minutes and 32 seconds with a varying degree of foreground passenger activities over the period. In the first step, the video summarisation approach discussed in Section 3 is applied to automatically extract 119 key scene frames. FIG. 6(b)-(f) present a few representative scene frames as a result of the process, depicting both quiet moments with no train calling at the platform and busy crowded moments with passengers getting on and off the train.

Figure 7:
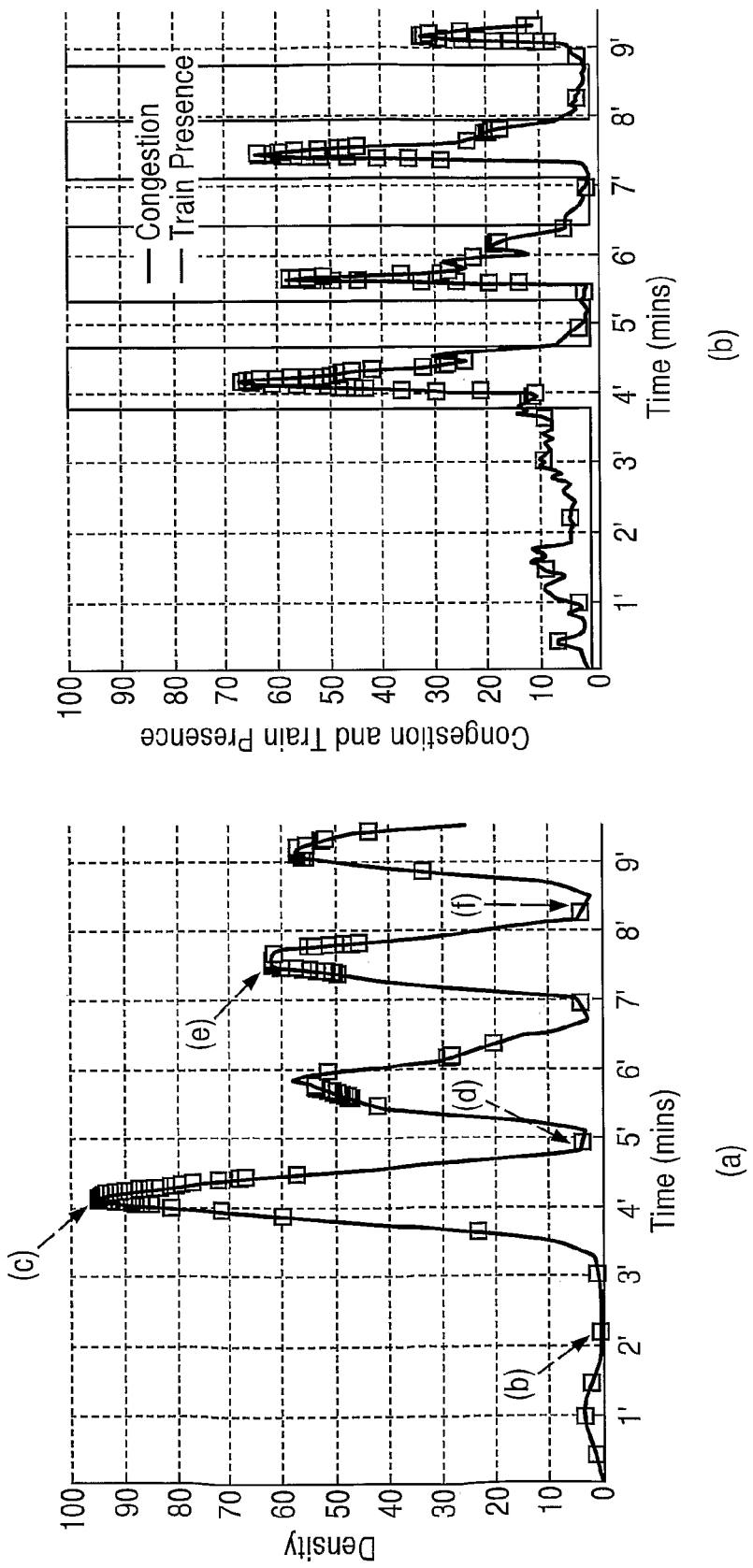
FIG. 7(a) illustrates a resulting scene change density curve and, in temporal order, the instants at which time the key frames are extracted to produce a video summarization.
FIG. 7(b) illustrates two automatically computed curves that characterize, respectively, the crowd congestion rating (0-100%) and train presence detection for the same platform video.

Next, the proposed approach for scene activity segmentation described in Section 4 is applied to the sequence of key frames. FIG. 7 (a) shows the resulting scene change density curve (in red), as well as, in temporal order, the instants (in green square) at which time the key frames are extracted to produce the video summarisation. For illustration purpose, the time indexes of representative key frames shown previously in FIG. 6 (b) to (f) are also indicated.

It can be seen from the two figures that the change in density curve indeed reveals the underlying change in platform scene activities (e.g., crowd movement and train presence): the troughs located at instant (b), (d), (f) depict typically a relatively quiet platform with little overall activities, and the peaks (c) and (e) represent a busy platform full of crowd movements caused by a train calling at the station. In fact, this video shows the typical morning rush, hour traffic in a city centre station: the platform normally starts off with a very quiet scene (e.g., a few waiting passengers standing or sitting next to the wall), when a train arrives, commuters rush to get off the train and exit the platform, generating a dynamic scene of a crowd quickly building up and then dissipating.

To further demonstrate the validity of this approach, additionally we include in FIG. 7 (b) two automatically computed curves that characterise, respectively, the crowd congestion rating (0-100%) and train presence detection for the same platform video, employing a dedicated proven technique from the authors' previous work [ref 4]. The positions of key frames from the present video summarisation process are also marked on the curve for illustration purpose.

By comparing these two independently obtained figures, it is interesting to see that the scene change density curve follows similar trend to the crowd congestion rating curve, even though the former does not incorporate any prior knowledge of the scene. Also, the proposed video summarisation technique tends to allocate a large number of key frames (scene clusters) extracted to characterise the high crowd congestion period and relatively few to describe the less busy and quiet periods. It makes sense, since the high congestion period coincides with more dynamic scene changes on the platform that should be represented by a greater number of key frames as compared to the low congestion period which indicates fewer changes on the platform.

Figure 8:
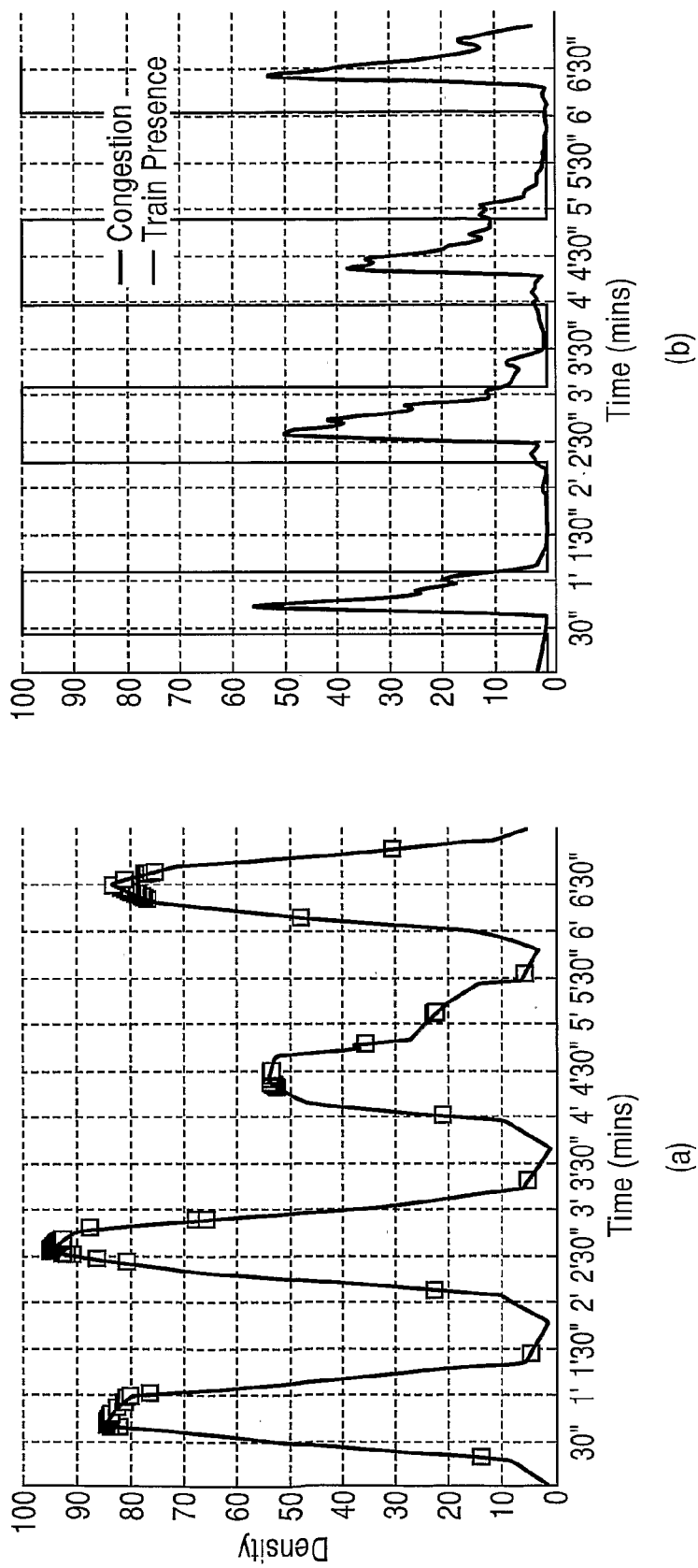

FIG. 8 shows another example of the platform scene activity analysis result for a 7 minutes and 7 seconds long morning rush hour platform video. For this scenario, similar observations as those in FIG. 7 can be made that the trend of scene change activity (a), computed without incorporating any prior knowledge of the domain, coincides well with the domain-oriented congestion estimation approach in (b).

Figure 9:
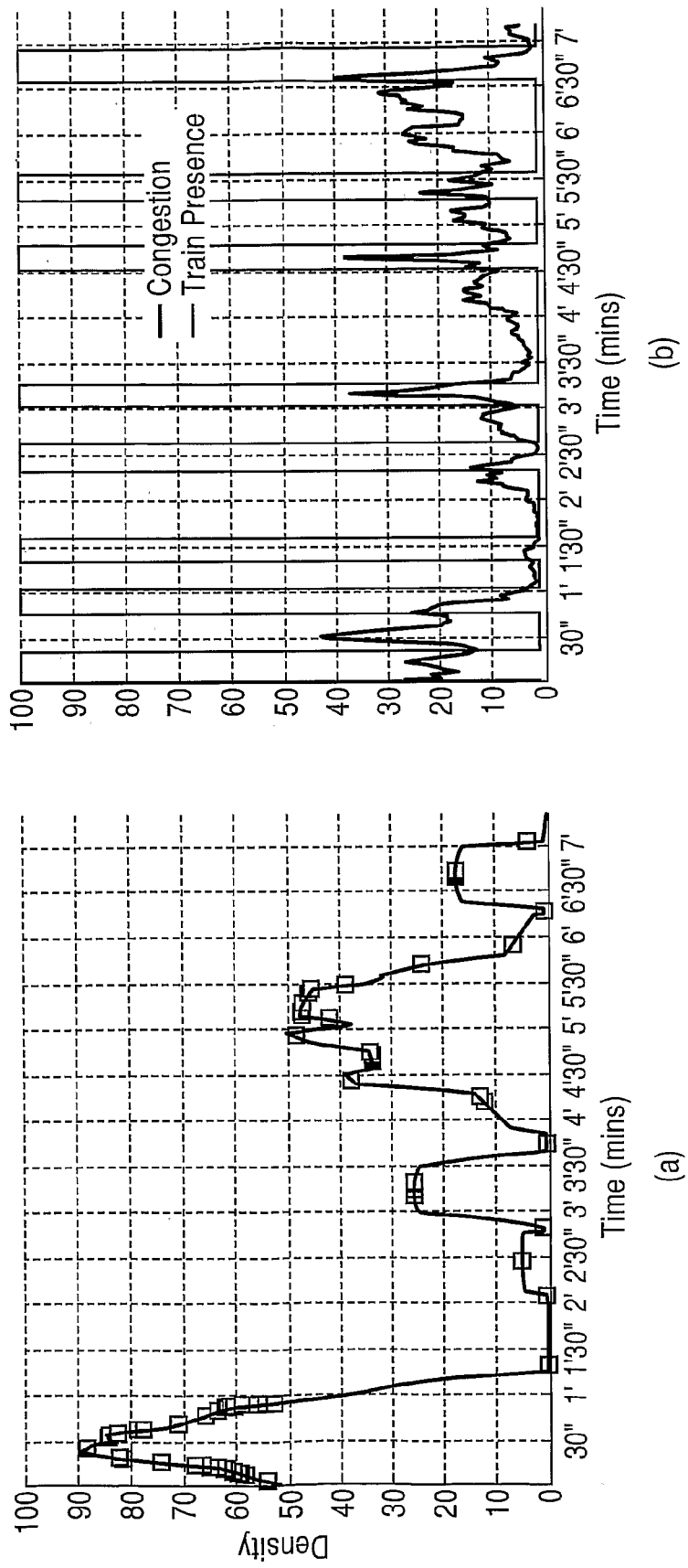
Figure 10:
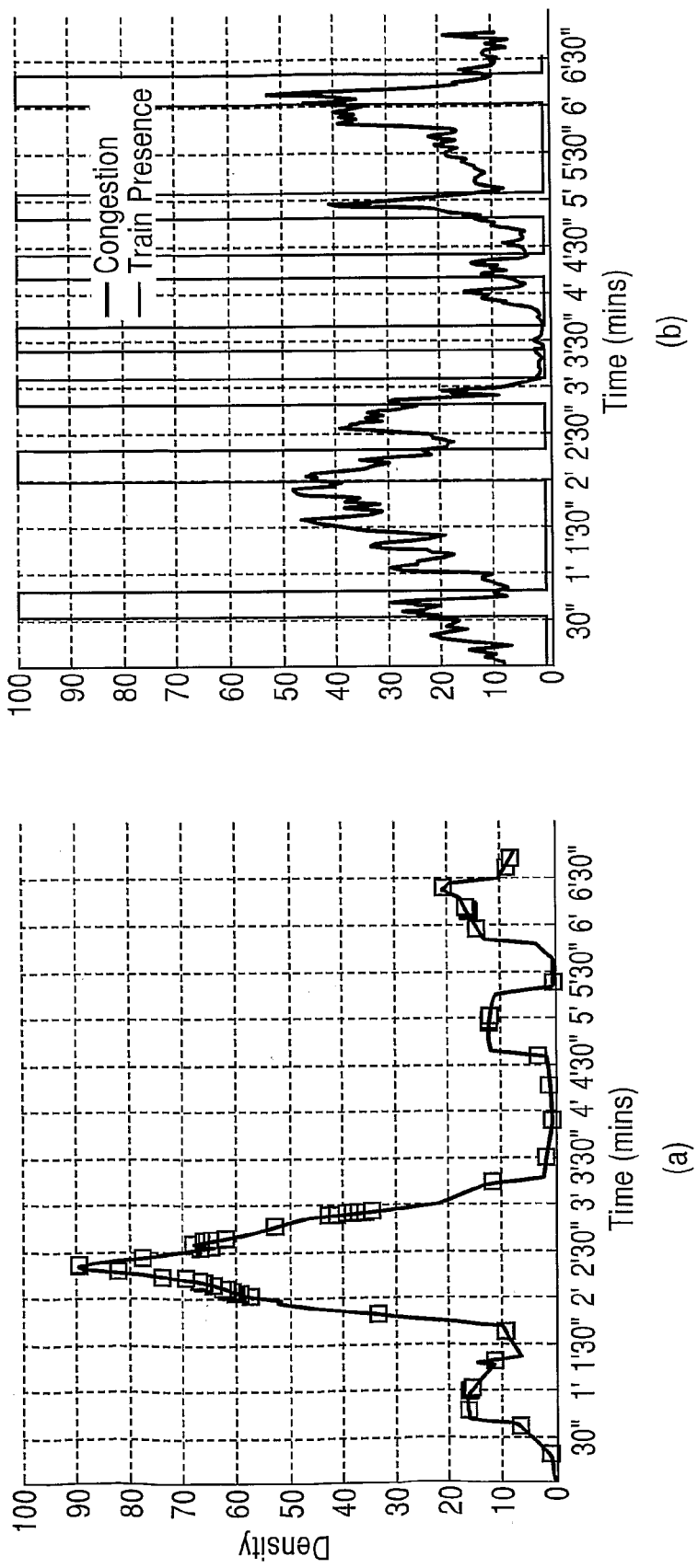

In FIG. 9 and FIG. 10, the comparative results for two more underground platform video clips captured in two different week days are presented, respectively. But, this time the evening peak hours' traffic is studied, showing a continuous stream of commuters entering the platform eager to catch a train to go home; the characteristics of scene changes are more complex than the recursive morning rush hours traffic discussed before. In these cases the train service is much more frequent and with a shorter calling time, and the scene activity segmentation is clearly obtained for both cases.

Airport Check-In Desk Area Scenarios

The next set of test video footages comes from publicly available PETS'2007 benchmarking videos [ref 5] shot at Glasgow Airport. These are videos captured by four cameras, monitoring the same or adjoined physical space (check-in desk areas) from different mounting positions whilst having different field of views and focus lengths. The video captures from the four cameras are synchronised, making it possible to conduct a co-operative multi-view video analysis if required. FIG. 11 shows one sample frame from each of the four cameras obtained at the same temporal position. Some explanations about the way the cameras are mounted are given below:

Camera-1 & 2 are mounted on one side of the court at about ground floor ceiling level; the two cameras share to a large extent an overlapping field of view Camera-3 & 4 are mounted on the other side of the court, with camera-3 being positioned on a tripod standing on the first floor level looking down through a tinted glass window, thus a considerably transformed video quality, and camera-4 positioned on a tripod standing on the ground floor level; these two cameras also share to a large extent overlapping fields of view but at considerably different focus length Camera-3 & 4 take a close-up view of the far side area of the space overlooked by Camera-1 & 2; as a reference to the above points, the woman donning an orange jacket is annotated and can be seen from all 4 cameras with different sizes, directions and perspective angles.

One problem with this video database collection is that it has only short videos each lasting about a couple of minutes long rather than videos observing a scene for a relatively long period of time, which is what we want. The length of the 8 short video clips that was recorded at different time of a day for each camera is given below:

| | Clip | | | | | | | |
|---|---|---|---|---|---|---|---|---|
| | 1 | 2 | 3 | 4 | 5 | 6 | 7 | 8 |
| Length | 3' | 2'40" | 3' | 1'59" | 1'56" | 1'49" | 2' | 2' |

For the purpose of this study to have a relatively long recorded video scene, the 8 short video clips for each camera are concatenated together in order, resulting in an artificially created test video of 18'24" long. This is not ideal though, as there are abrupt changes between the consecutive video segments due to scene interruptions, lighting changes, imaging sensor thermal noises, etc.

Figure 12:
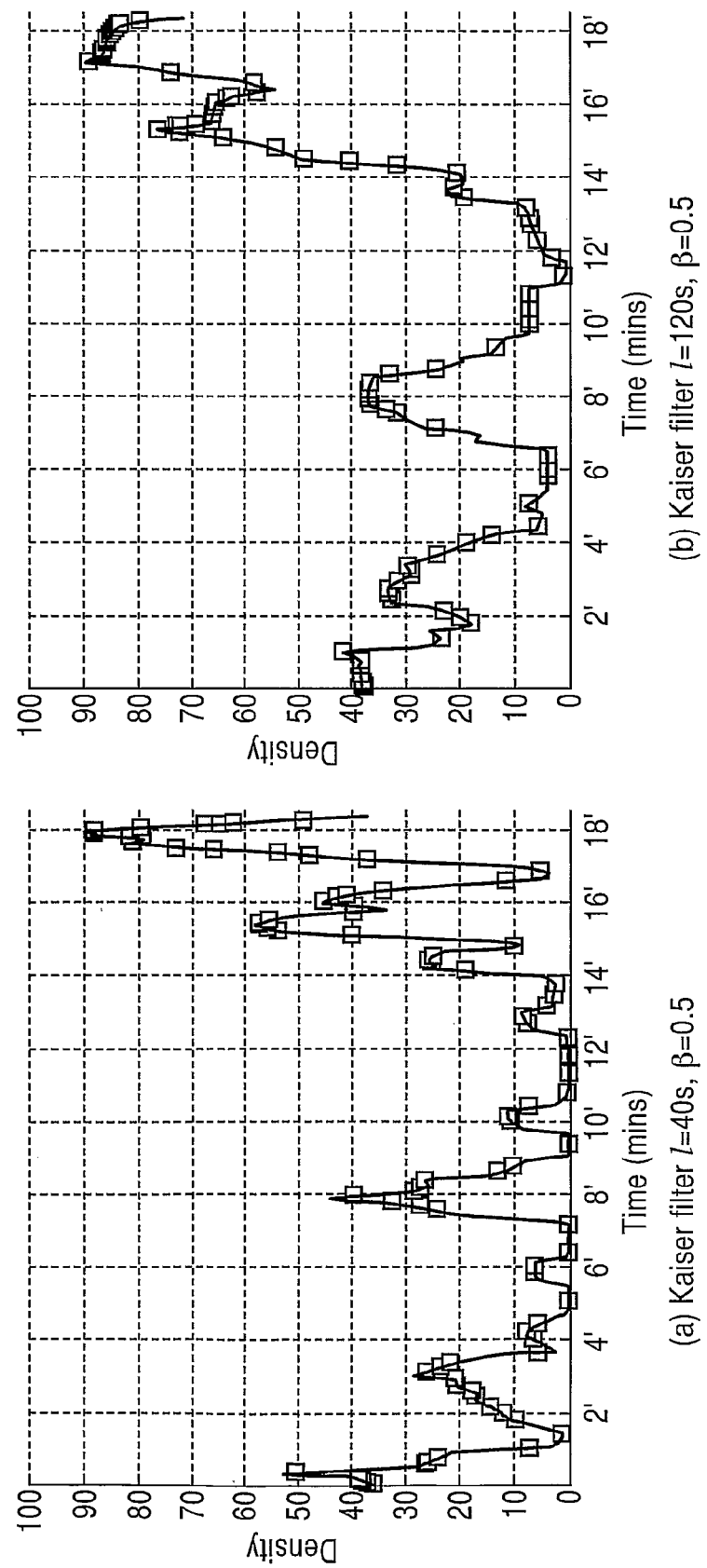
Figure 13:
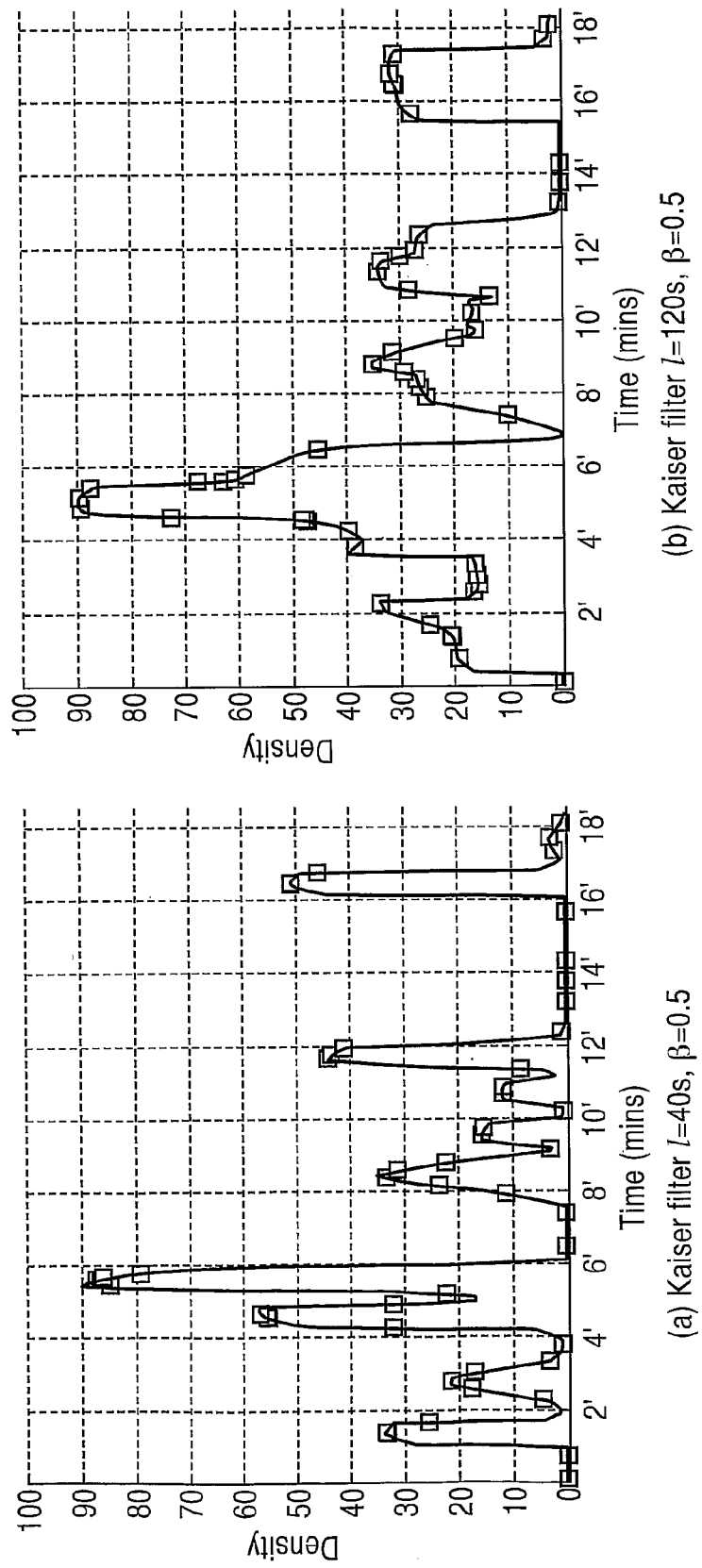

FIG. 12 and FIG. 13 show, for camera-1 and -2, respectively, the scene activity density curve obtained when applying two Kaiser Filters of the same shape parameter but different length of 40 seconds and 120 seconds. It can be seen from FIG. 12 that there exist clearly identified local peaks and troughs that segment the underlying scene activities into different status of degree of changing activity (inactivity). And furthermore, if the smoothing window (Kaiser Filter) is larger, as in (b), then the adjacent shorter events, as in (a), tend to be absorbed into a longer event, reflecting the changes in event granularity. The same observations apply to the case of Camera-2 in FIG. 13.

Validation for Multi-View Scenario

Figure 14:
Figure 14:

In order to apply the approach to a multi-view video scenario that reflects a wider situational status/change of a monitored site by observing it from different cameras and angles, we have chosen to compose a mosaic video scene captured by both two and all four of the synchronised cameras. The simplest way is to join the original frames side by side, as is shown in FIG. 14 (a) for two cameras and (b) for all four cameras, respectively. Again, this is not an ideal positioning and configuration of a camera network to monitor this type of space.

Figure 15:
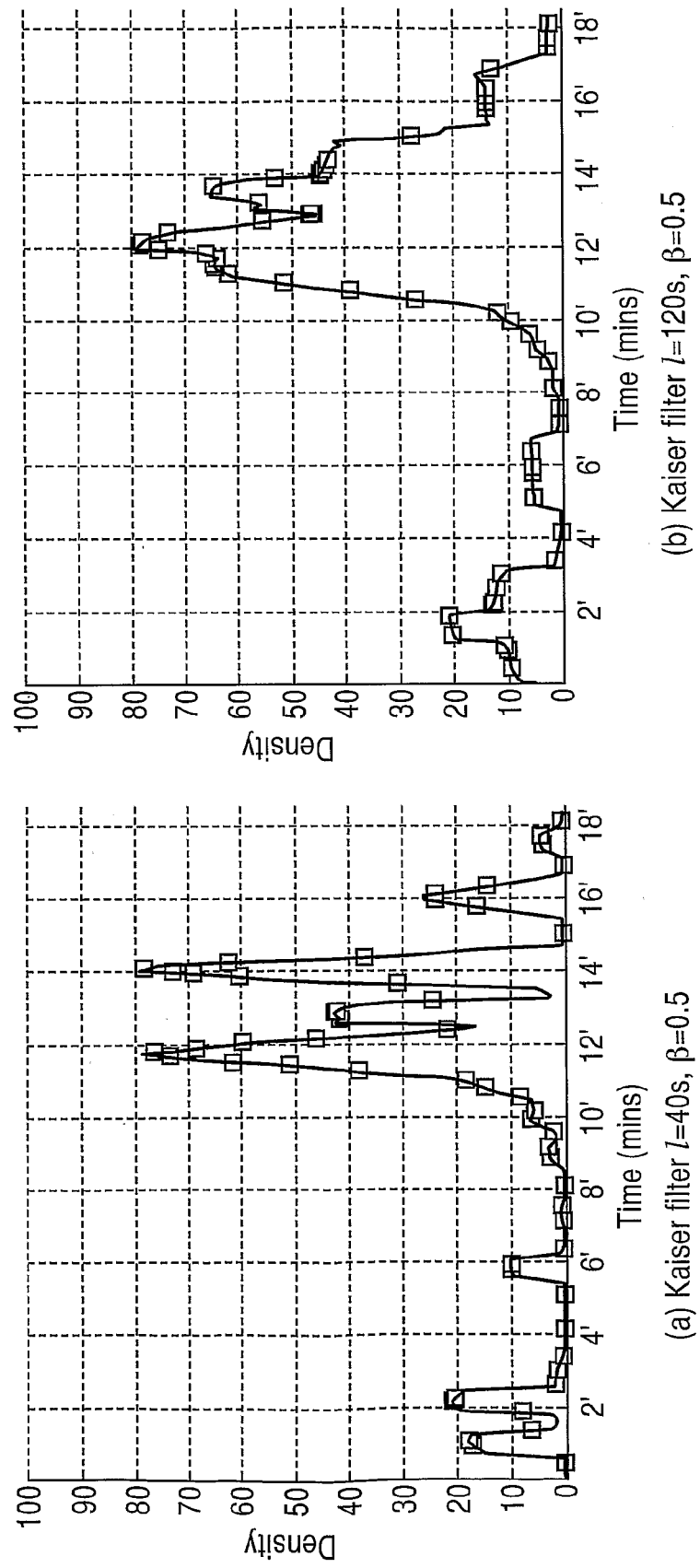

These two multi-view videos are analysed in exactly the same way as in previously discussed single view video cases (see, also FIG. 1), in respect of both key frames (events, scenes) extraction in video summarisation and the smoothed density curve computation in scene activity segmentation. FIG. 15 and FIG. 16 show the resulting scene activity curves, with marked positions of key frames, for the two-view and four-view monitoring scenarios, respectively.

It can be seen that, given the same number of key frames/events extracted, or 56, the scene changes as captured by the two-view and four-view videos are slightly different in terms of the time and frequency that these changes happen. This is in line with our human experience, when there is more than one different opinion on a topic issue, the consensus view that takes account of the differences is often a more balanced one.

It is important to note that a higher value in the density curve does not necessarily mean a higher crowd presence (foreground scene occupancy) situation in the monitored site. There may be the case that a large crowd of people can be around in the scene, but if it is largely stabilised, or if there is little perceived movement among them, then the density value can be low (See, for example, the three snapshots $s_1$, $s_2$, and $s_3$, depicted in FIG. 17, which correspond to the respective moments marked in FIG. 16 (b)). Therefore, the semantics that the density curve really manifests are the changes in underlying scene activity captured by the video; the detection of these changes gives a meaningful segmentation of the long-term (gradual) scene events/activities over time.

We have introduced in this application an original approach for automated surveillance video analysis, from extraction of key frame (events) for video summarisation purpose to segmentation of scene change activities for annotating dynamic events, without resorting to any prior knowledge about a particular problem domain. Especially, this holistic approach has been applied to both single-view videos monitored by individual cameras and multi-view mosaic video captured by a camera network. Experiments on real-world scenarios of crowd movements from operational underground platform to airport forecourt check-in desk area have demonstrated the effectiveness of this approach. Future work includes setting up a proper camera network for capturing longer time videos of a crowded surveillance site and more evaluations on the impact of algorithms' parameters setting on the performance of the system, and investigation into the wide applicability of the segmentation of activities in connection with particular business domain requirements.

REFERENCES

[1] Li-Qun Xu, Bin Luo, "Appearance-based video clustering in 2D locality preserving projection subspace," *Proc. of ACM International Conference on Image and Video Retrieval*, (CIVR'2007), Jul. 9-11, 2007. Amsterdam, Netherlands.

[2] Alan Hanjalic and Li-Qun Xu, "Affective video content representation and modeling," in *IEEE Transactions on Multimedia*, Vol. 7, No. 1, February 2005.
[3] A. K. Jain, M. N. Murty, P. J. Flynn, "Data clustering: A review," *ACM Computing Surveys*, Vol. 31, No. 3, pp. 264-323, September 1999.
[4] Li-Qun Xu and A. Anjulan, "Crowd behaviours analysis in dynamic visual scenes of complex environment," *IEEE ICIP Workshop on Multimedia Information Retrieval: New Trends and Challenges*, San Diego, Calif., October 2008.
[5] PETS' 2007 (http://pets2007.net/) benchmarking data sets: http://www.cvg.rdg.ac.uk/PETS2007/data.html

The invention claimed is:

1. A method of segmenting a sequence of video images according to scene activity, the method comprising:
   defining a first series of nodes in a first multi-dimensional space, each of the first series of node corresponding to an image of the series of images and its location in the first space being defined in dependence on appearance components of the respective image;
   defining a transformation function that maps each of the first series of nodes to a corresponding node in a second multi-dimensional space having a lower dimensionality than the first multi-dimensional space in such a way that neighborhood relationships that exist between the nodes in the first multidimensional space are preserved between the respective nodes in the second multidimensional space;
   applying said transformation function to each of the first series of nodes to define a second series of respective nodes in the second multi-dimensional space;
   applying a data clustering algorithm to the second series of nodes to identify clusters of nodes within the second multi-dimensional space, characterized in that
   the data clustering algorithm being constrained by a measure of feature distance between a pair of clusters of nodes and a measure of temporal distance, between the pair of clusters of nodes; further characterized by
   determining a representative image from each cluster of nodes and plotting each representative image with respect to a measure of the elapsed time of the sequence of video images to form an scene density curve indicating the underlying scene change activities, the scene density value for each representative image being inversely related to the time interval between that image's neighboring representative images; and
   segmenting the sequence of video images in accordance with local minima and/or maxima of the scene density curve.

2. The method of claim 1, wherein the data clustering algorithm includes computing the measure of feature distance and the measure of temporal distance between pairs of nodes, selecting a pair of nodes and determining if the measure of temporal distance between the selected nodes is within a temporal threshold value.

3. The method of claim 2, wherein if the measure of temporal distance is within the temporal threshold value then further determining if the measure of feature distance between the selected nodes is within a feature distance threshold value.

4. The method of claim 3, wherein if the measure of feature distance is within the feature distance threshold value then merging the selected nodes to form a new single node.

5. The method of claim 2, wherein if the measure of temporal distance exceeds the temporal threshold value then a further pair of nodes are selected.

6. The method of claim 5, wherein the pairs of nodes are selected in ascending order of feature distance.

7. The method of claim 1, wherein the scene density curve is smoothed by application of a fitter.

8. The method of claim 7, wherein the filter has a window length.

9. The method of claim 8, wherein the filter window length is selected in dependence on one or more of the duration of the sequence of video images and the average duration of scene activity within the video images.

10. The method of claim 7, wherein the filter comprises a Kaiser filter.

11. A video processing system comprising a source of a sequence of video images and a data processor arranged to process the video images according to the method of claim 1.

* * * * *